United States Patent
Tao

(10) Patent No.: US 10,288,141 B2
(45) Date of Patent: May 14, 2019

(54) PRESSURE-ADJUSTABLE GAS SPRING

(71) Applicant: CHANGZHOU LANT GAS SPRING CO., LTD., Changzhou (CN)

(72) Inventor: Shengrong Tao, Changzhou (CN)

(73) Assignee: CHANGZHOU LANT GAS SPRING CO., LTD., Changzhou (CN)

( * ) Notice: Subject to any disclaimer, the term of this patent is extended or adjusted under 35 U.S.C. 154(b) by 0 days.

(21) Appl. No.: 15/815,320

(22) Filed: Nov. 16, 2017

(65) Prior Publication Data

US 2018/0355937 A1 Dec. 13, 2018

(30) Foreign Application Priority Data

Jun. 8, 2017 (CN) .................... 2017 2 0664486 U

(51) Int. Cl.
*F16F 9/02* (2006.01)
*F16F 9/06* (2006.01)
*F16F 9/34* (2006.01)

(52) U.S. Cl.
CPC ............ *F16F 9/067* (2013.01); *F16F 9/0263* (2013.01); *F16F 9/063* (2013.01); *F16F 9/34* (2013.01)

(58) Field of Classification Search
CPC .. F16F 9/063; F16F 9/34; F16F 9/0245; F16F 9/067; F16F 9/0263; B62K 25/08
USPC ............. 267/64.12, 124, 64.11, 64.13, 64.28
See application file for complete search history.

(56) References Cited

U.S. PATENT DOCUMENTS

| | | | | |
|---|---|---|---|---|
| 4,386,766 A | * | 6/1983 | Bauer ...................... | A47C 3/30 188/300 |
| 4,779,851 A | * | 10/1988 | Bauer ................... | F16F 9/0245 188/300 |
| 5,273,259 A | * | 12/1993 | Bauer ................... | F16F 9/0245 267/64.12 |
| 5,570,873 A | * | 11/1996 | Bauer ...................... | A47B 9/10 188/300 |
| 6,105,988 A | * | 8/2000 | Turner ................... | B62K 25/08 188/319.1 |
| 7,195,234 B2 | * | 3/2007 | Jordan ................... | B62K 25/08 267/64.11 |
| 2008/0116622 A1 | * | 5/2008 | Fox ........................ | B62K 25/08 267/64.28 |

FOREIGN PATENT DOCUMENTS

| CN | 202402546 U | | 8/2012 |
|---|---|---|---|
| CN | 104687821 A | * | 6/2015 |

* cited by examiner

*Primary Examiner* — Pamela Rodriguez
(74) *Attorney, Agent, or Firm* — W&K IP

(57) ABSTRACT

A pressure-adjustable gas spring is invented. A gas spring mainly consists of a cylinder tube, a piston in the cylinder tube, a piston rod, a valve rod and so on; gas and oil liquid are stored in the cylinder tube. Since the piston occupies the volume in the cylinder tube, the piston is compressed into the cylinder tube when working, then the piston moves in the axial direction in the cylinder tube to press the oil liquid, then the oil liquid compresses the gas so that the piston reaches the working position; when the external force loaded on the piston rod is removed, the gas recovers and expands, and the expanded gas pushes the oil liquid to reset the piston and move out the piston rod, so that the gas spring realizes a compression motion and a restoration damping motion.

5 Claims, 5 Drawing Sheets

PRESSURE-ADJUSTABLE GAS SPRING

CROSS-REFERENCE TO RELATED APPLICATIONS

This application claims priority to Chinese Patent Application No. 201720664486.8 with a filing date of Jun. 8, 2017. The content of the aforementioned applications, including any intervening amendments thereto, are incorporated herein by reference.

TECHNICAL FIELD

The disclosure relates to a pressure-adjustable gas spring.

BACKGROUND OF THE PRESENT INVENTION

A gas spring mainly consists of a cylinder tube, a piston in the cylinder tube, a piston rod, a valve rod and so on; gas and oil liquid are stored in the cylinder tube. Since the piston occupies the volume in the cylinder tube, the piston is compressed into the cylinder tube when working, then the piston moves in the axial direction in the cylinder tube to press the oil liquid, then the oil liquid compresses the gas so that the piston reaches the working position; when the external force loaded on the piston rod is removed, the gas recovers and expands, and the expanded gas pushes the oil liquid to reset the piston and move out the piston rod, so that the gas spring realizes a compression motion and a restoration damping motion.

The utility model with application number of CN202402546U discloses a lifting gas spring of a rigid locking seat, as shown in FIG. 5, including a cylinder tube 5, a piston rod 1, a valve body 10 and a valve core 11; a guide sleeve 2 and a guide sealing ring 3 are sleeved on the piston rod 1 and are installed in the cylinder tube 5, one end of the piston rod 1 penetrates out the cylinder tube 5 and the other end has a piston 8, an inner annular tube 6 is fixed in the cylinder tube 5 through a front support 4 having damping air holes 4-1 at two ends and a valve body 10 having a damping oil hole 10-1, the piston 8 is arranged in the inner annular tube 6 in sealing mode and divides the inner annular tube 6 into a front inner gas cavity 18 and a rear inner oil cavity 16, the valve body 10 is connected with the cylinder tube 5 and the inner annular tube 6 in sealing mode, the valve core 11 is installed on the valve body 10 through an abrasion resistant sleeve 15, an oil hole 15-1 is arranged on the abrasion resistant sleeve 15, a valve cover at the front end of the valve core 11 corresponds to a valve seat 9 on the valve body 10, the rear end of the valve core 11 penetrates out the valve body 10 to correspond to a starting rod 13, the starting rod 13 is installed on the rear portion of the cylinder tube 5 through a rear support 12, a floating separator piston 7 is installed between the cylinder tube 5 and the inner annular tube 6 in sealing mode and divides the cavity between the cylinder tube 5 and the inner annular tube 6 into a front outer gas cavity 19 and a rear outer oil cavity 17, the front inner gas cavity 18 is communicated with the front outer gas cavity 19 through the damping air hole 4-1 arranged on the front support 4, and the rear outer oil cavity 17 is communicated with the rear inner oil cavity 16 through the damping oil hole 10-1 on the valve body 10 and the oil hole 15-1 on the abrasion resistant sleeve 15.

As for the above gas spring, when a load is greater than the internal pressure in the gas spring, the piston rod 2 cannot extend normally or cannot fully extend to the working position; the pressure-adjustable gas spring of the disclosure solves the above problem; when the load is greater than the pressure of the gas spring by certain weight, the stretching force and the compressing force can be adjusted by adjusting the volume of the gas cavity through a pressure adjustment shaft.

SUMMARY OF PRESENT INVENTION

In view of the above technical problem, the disclosure provides a pressure-adjustable gas spring.

The technical scheme of the disclosure is as follows.

A pressure-adjustable gas spring includes: an outer cylinder tube provided with openings at two ends, one end of the outer cylinder tube being provided with a first plug having a first through hole and the other end of the outer cylinder tube being provided with a second plug having a second through hole;

an inner cylinder tube located inside the outer cylinder tube and provided with openings at two ends, a floating separator piston being arranged between the inner cylinder tube and the outer cylinder tube;

a piston rod, one end of the piston rod being provided with a first piston and located in the inner cylinder tube and the other end of the piston rod passing through the first plug to extend outside the outer cylinder tube after being in clearance fit with one end of the inner cylinder tube;

a valve body, one end of the valve body being located in the outer cylinder tube and provided with a first sealing element and the other end of the valve body being located in the inner cylinder tube and provided with a second sealing element, and on the valve body being provided a first hole allowing a liquid medium to flow through and a second hole communicated with first hole, the first hole being arranged along the radial direction of the valve body and the second hole being arranged along the axial direction of the valve body;

a control component controlling the liquid medium to flow through the valve body, one end of the control component blocking the second hole under the pressure of the liquid medium; wherein the valve body is one that can move along the axial direction of the outer cylinder tube and the inner cylinder tube;

the pressure-adjustable gas spring further includes: an adjustment assembly capable of enabling the valve body to move along the axial direction of the outer cylinder tube and the inner cylinder tube, the adjustment assembly being arranged on the second plug, one end of the adjustment assembly passing through the second plug to press against the valve body and the other end of the adjustment assembly being exposed to air, a through hole being arranged on the adjustment assembly, one end of the control component being exposed to air after passing through the second hole on the valve body and the through hole on the adjustment assembly in turn.

The disclosure has benefits as follows: the position of the valve body can be adjusted through the adjustment assembly, the oil cavity is arranged between the valve body and the floating separator piston, since the hydraulic oil is an incompressible medium, after the adjustment assembly is adjusted, the floating separator piston is compelled to move, then the floating separator piston compresses the nitrogen gas in the gas cavity; as the volume of the gas cavity is reduced, the internal pressure intensity is increased, therefore, the region loaded with gas is compressed, and the internal pressure intensity is increased, thereby a pressure adjustable function is realized; when the control component is started, the pressure stressed on the floating separator piston also increases, and the stretching force of the piston rod during stretching increases too; therefore, when the load becomes heavier (within certain load), there is still enough thrust force, the piston rod of the gas spring can fully extend to the highest point. When adjusting reversely, since certain pressure exists internally, the floating separator piston moves upwards under the pressure of the gas cavity below, thereby pushing upwards the hydraulic oil in the upper oil cavity and the valve body, then the volume of the gas cavity becomes bigger, therefore, when the piston rod of the gas spring is compressed, the pressure is reduced, and the piston rod can lower easily.

The pressure-adjustable gas spring of the disclosure not only solves the rigid locking problem in existing technologies, but also solves the problem of the incapability of normal stretching when the load becomes heavier; in existing technologies when the load is greater than the internal pressure in the gas spring, the piston rod cannot extend normally or cannot fully extend to the working position; the pressure-adjustable gas spring of the disclosure solves the above problem; when the load is greater than the pressure of the gas spring by certain weight, the stretching force and the compressing force can be adjusted by adjusting the volume of the gas cavity through the adjustment assembly.

DESCRIPTION OF DESIGNATORS IN FIG. 1 TO FIG. 3

1 represents an outer cylinder tube, 2 represents a first plug, 3 represents a second plug, 4 represents an inner cylinder tube, 5 represents a floating separator piston, 6 represents a piston rod, 6a represents a first piston, 7 represents a ventilated support, 7a represents a radial extension portion, 8 represents a bracket, 9 represents a valve body, 9a represents a first sealing element, 9b represents a second sealing element, 9c represents a first hole, 9d represents a second hole, 9e represents a spacer bush, 9f represents a sealing ring, 10 represents a control component, 10a represents a projection, 11 represents an annular tube, 12 represents a rotating sleeve, 12a represents a radial protrusion, 12b represents an axial extension portion, 13 represents a hollow shaft, 13a represents a guide element, 14 represents a tightening cap, 15 represents a bearing, and 16 represents a shaft sleeve.

DETAILED DESCRIPTION OF PREFERRED EMBODIMENTS

Embodiment 1

Figure 1:
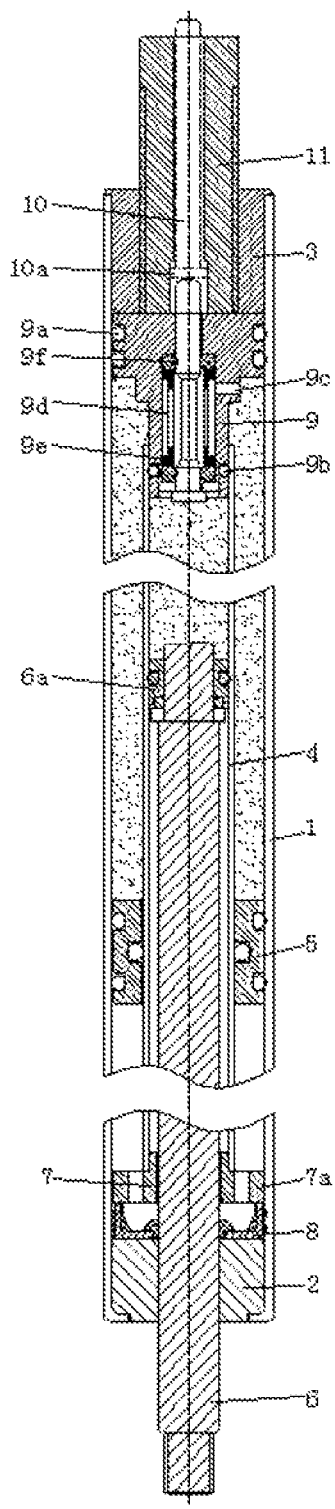
FIG. 1 is a diagram illustrating a sectional structure of a pressure-adjustable gas spring of the disclosure.

As shown in FIG. 1, the pressure-adjustable gas spring of the disclosure includes an outer cylinder tube, an inner cylinder tube, a floating separator piston, a piston rod, a valve body and an adjustment assembly; the structure of each part and the relationship among the parts are described below in detail.

The outer cylinder tube 1 is provided with openings at two ends, one end of the outer cylinder tube 1 is provided with a first plug 2 having a first through hole and the other end of the outer cylinder tube is provided with a second plug 3 having a second through hole, the first plug 2 and the second plug 3 preferably are in interference fit with the outer cylinder tube 1. The inner cylinder tube 4 is provided with openings at two ends and the inner cylinder tube 4 is located inside the outer cylinder tube.

The floating separator piston 5 is arranged between the inner cylinder tube and the outer cylinder tube, the floating separator piston 5 divides the outer cylinder tube 1 into two regions, the region located on one side of the floating separator piston 5 is loaded with a liquid medium (for example, oil), the region located on the other side of the floating separator piston 5 is loaded with gas (for example, nitrogen gas), and the floating separator piston 5 can move along the axial direction of the outer cylinder tube 1 when the pressures in the regions on the two sides are changed.

One end of the piston rod 6 is provided with a first piston 6a and located in the inner cylinder tube 4 and the other end of the piston rod 6 passes through the first plug to extend outside the outer cylinder tube to be exposed to air after being in clearance fit with one end of the inner cylinder tube 4; the inner cylinder tube 4 is divided into two regions through the piston rod 6 and the first piston 6a arranged on the piston rod 6, the region located on one side of the first piston 6a is loaded with a liquid medium example, oil), the region located on the other side of the first piston 6a is loaded with gas (for example, nitrogen gas), and, when the pressures in the regions on the two sides are changed, the piston rod 6 and the first piston 6a can move along the axial direction of the inner cylinder tube 4, so that the piston rod 6 produces an action of stretching or retracting, thereby driving a load connected with the end part of the piston rod 6 exposed to air to generate a corresponding action, for example, the raising or lowering of the load in the longitudinal direction, or the feeding or retracting of the load in the horizontal direction.

A ventilated support 7 is arranged in the inner cylinder tube 4, one end of the ventilated support 7 is located in the inner cylinder tube 4, a central hole is arranged on the ventilated support 7, the piston rod 6 passes through from the central hole on the ventilate support 7, so that the piston rod 6 is in clearance fit with the ventilated support 7; a radial extension portion 7a is arranged on the ventilated support 7, the other end of the ventilated support 7 is located outside the inner cylinder tube 4, the radial extension portion 7a is arranged on the portion of the ventilated support 7 located outside the inner cylinder tube 4, the radial extension portion 7a is matched with the outer cylinder tube 1, in this way, the inner cylinder tube 4 is supported through the ventilated support 7 in the outer cylinder tube 1; an air hole is arranged on the radial extension portion 7a, the air hole allows the region of the outer cylinder tube 1 loaded with gas to be communicated with the region of the inner cylinder tube 4 loaded with gas, so that, after the ventilate support 7 is installed, the regions of the outer cylinder tube 1 and the inner cylinder tube 4 loaded with gas are not clogged. A space or gap is arranged between the ventilated support 7 and the first plug 2, when there is a space, the disclosure arranges a bracket 8 cladded with a sealing element between the ventilated support 7 and the first plug 2, so that a cavity is formed between the ventilated support 7 and the bracket 8, allowing the gas to smoothly flow between the region of the outer cylinder tube 1 loaded with gas and the region the inner cylinder tube 4 loaded with gas.

One end of the valve body 9 is located in the outer cylinder tube and provided with a first sealing element 9a and the other end of the valve body 9 is located in the inner cylinder tube and provided with a second sealing element 9b, and on the valve body 9 is provided a first hole 9c allowing a liquid medium to flow through and a second hole 9d communicated with first hole, the first hole 9c is arranged along the radial direction of the valve body 9 and the second hole 9d is arranged along the axial direction of the valve body 9; a spacer bush 9e is arranged in the second hole 9d, the spacer bush 9e is provided with an opening allowing the liquid medium to flow through, sealing rings 9f which are located on two ends of the spacer bush 9e are further arranged in the second hole 9d. The valve body 9 is a valve body that can move along the axial direction of the outer cylinder tube and the inner cylinder tube, preferably, the valve body 9 is spacedly matched with the outer cylinder tube 1 and the valve body 9 is spacedly matched with the inner cylinder tube 4; the liquid medium in the outer cylinder tube 1 is sealed through the first sealing element 9a, avoiding that the liquid medium in the outer cylinder tube 1 flows out through the gap between the valve body 9 and the outer cylinder tube. The liquid medium in the inner cylinder tube 4 is sealed through the second sealing element 9b, avoiding that the liquid medium in the inner cylinder tube 4 flows between the region of the outer cylinder tube 1 loaded with liquid medium and the region of the inner cylinder tube 4 loaded with liquid medium when not controlled by the valve body 9 and the control component 10.

The control component 10 controls the liquid medium to flow through the valve body, the control component 10 is rod shaped, and one end of the control component 10 blocks the second hole under the pressure of the liquid medium.

The adjustment assembly 9 is capable of enabling the valve body to move along the axial direction of the outer cylinder tube 1 and the inner cylinder tube 4, the adjustment assembly is arranged on the second plug 3, one end of the adjustment assembly passes through the second plug 3 to press against the valve body 9 and the other end of the adjustment assembly is exposed to air, a through hole is arranged on the adjustment assembly, one end of the control component 10 is exposed to air after passing through the second hole on the valve body and the through hole on the adjustment assembly in turn. The second through hole on the second plug 3 is a threaded hole, the adjustment assembly includes an annular tube 11, a thread is arranged on the outer circumference surface of the annular tube 11, and the annular tube 11 extends into the second through hole to connect with the second plug 3 through thread. By positively rotating the annular tube 11, the annular tube 11 exerts an axial feed force to the valve body 9 when feeding, thus the valve body 9 moves towards the piston rod 6; since the liquid medium is difficult to or cannot be compressed, the feeding force acts on the floating separator piston 5, so that the floating separator piston moves, thereby compressing the gas in the region loaded with gas, in this way, the region loaded with gas becomes smaller, however, the pressure generated by the gas becomes bigger. When reversely rotating the annular tube 11, the annular tube 11 retracts, then, the region loaded with gas becomes larger and the pressure generated by the gas becomes smaller. Therefore, by positively and reversely rotating the annular tube 11, the pressure generated by the gas changes, thus, the overall pressure of the gas spring can be adjusted as needed. A radial projection 10a is arranged on the control component 10 and the through hole on the annular tube 11 is a stepped hole. The step surface of the stepped hole can axially limit the radial projection 10a.

Embodiment 2

The difference between this embodiment and the above embodiment lies in that the adjustment assembly has a different structure; the adjustment assembly in this embodiment has a specific structure as follows.

Figure 2:
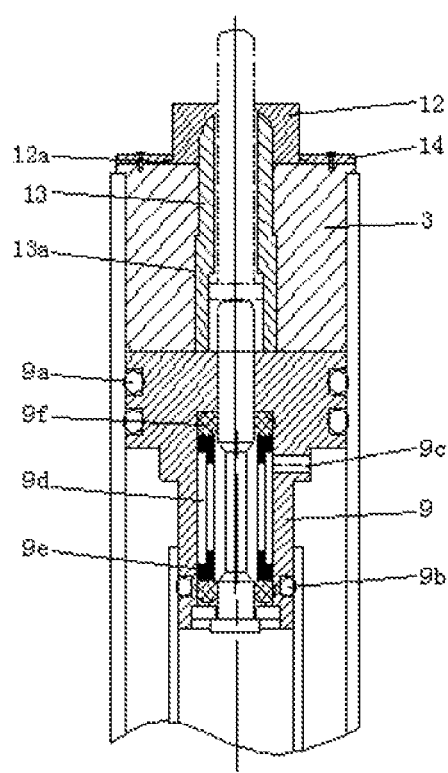
FIG. 2 is a diagram illustrating an embodiment of a second pressure-adjustable gas spring of the disclosure.
Figure 3:
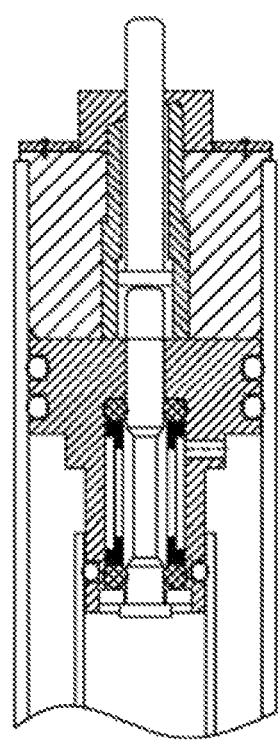
FIG. 3 is a diagram illustrating another embodiment of the second pressure-adjustable gas spring of the disclosure.

As shown in FIG. 2 and FIG. 3, the adjustment assembly includes: a rotating sleeve 12, a hollow shaft 13 and a tightening cap 14. The rotating sleeve 12 is arranged on the second plug in a rotatable manner, the rotating sleeve is axially limited on the second plug, the tightening cap 14 is provided with an assembly hole, a radial protrusion 12a is arranged on the outer circumference surface of the rotating sleeve 12, and, after the tightening cap 14 is sleeved on the rotating sleeve 12 and pressed on the radial protrusion 12a of the rotating sleeve 12, the tightening cap 14 is in fixed connection with the second plug 3 so as to axially limit the rotating sleeve 12. The assembly hole on the tightening cap 14 is a stepped hole, and the step surface of the stepped hole presses against the radial protrusion 12a on the rotating sleeve 12. In a preferred embodiment, the rotating sleeve 12 and the radial protrusion 12a are in clearance fit with the stepped hole on the tightening cap 14; in this way, the rotating sleeve 12 not only is limited in the axial direction, but also is limited in the radial direction; in addition, the rotating sleeve 12 also can be rotated freely.

One end of the hollow shaft 13 passes through the second plug 3 to press against the valve body 9 and the other end of the hollow shaft 13 has an axial end surface of curved surface (for example, cam curved surface), or oblique plane or asymmetrical spherical surface; the through hole inner surface of the rotating sleeve 12 is provided with a curved surface or oblique plane or asymmetrical spherical surface matched with the surface of the hollow shaft 13; in the embodiment shown in FIG. 2, the hollow shaft 13 and the rotating sleeve 12 are matched through an asymmetrical spherical surface; in the embodiment shown in FIG. 3, the hollow shaft 13 and the rotating sleeve 12 are matched through an oblique plane. When the rotating sleeve 12 is rotated, the rotating sleeve 12 and the hollow shaft 13 press against each other through the curved surface or oblique plane or asymmetrical spherical surface to make the hollow shaft produce an axial displacement. In order to prevent the hollow shaft 13 rotating following the rotating sleeve 12 due to friction, a guide element 13a is arranged on the outer circumference surface of the hollow shaft 13, a guide groove is arranged on the inner surface of the second through hole of the second plug 3, and the guide element 13a is in clearance fit in the guide groove. In this way, when the rotating sleeve 12 is rotated, even though there is friction between the rotating sleeve 12 and the hollow shaft 13, the hollow shaft 13 cannot rotate because the hollow shaft 13 is limited in the circumference direction through the combination of the guide element 13a and the guide groove, thereby the hollow shaft 13 can only move in the axial direction.

Embodiment 3

Figure 4:
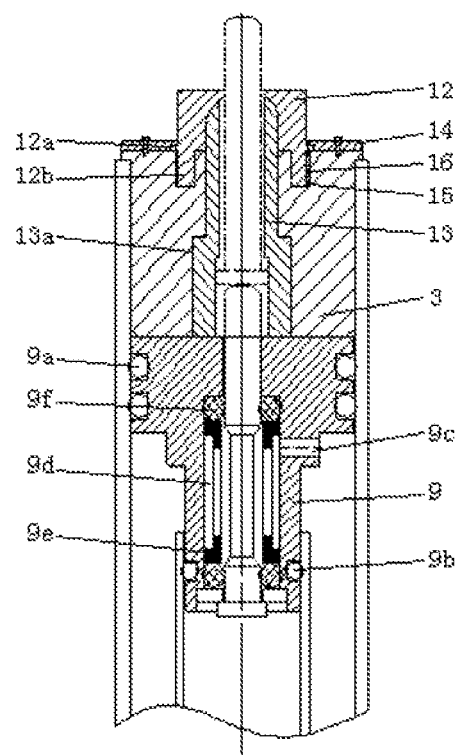
FIG. 4 is a diagram illustrating a sectional structure of a third pressure-adjustable gas spring of the disclosure.
Figure 5:
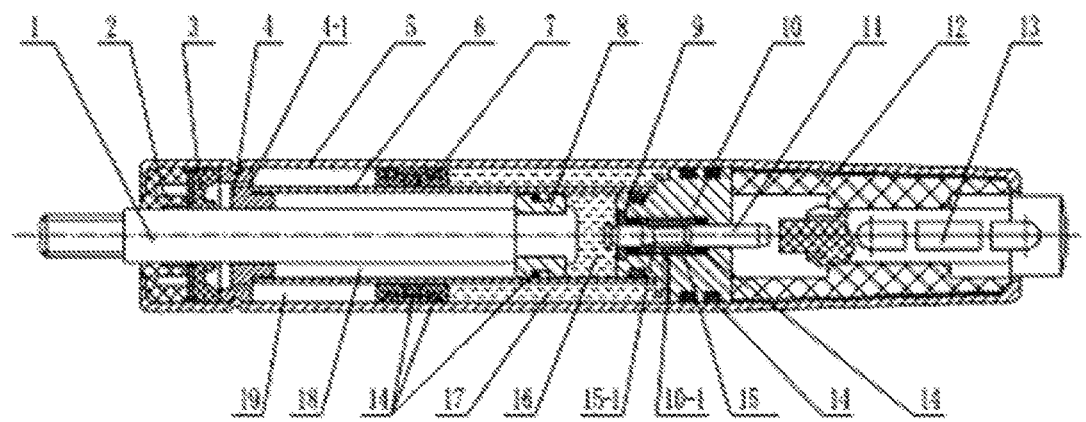
FIG. 5 is a diagram illustrating a lifting gas spring of a rigid locking seat in existing technologies.

The difference between this embodiment and the second embodiment lies in that, on the basis of the second embodiment (as shown in FIG. 4), a ring shaped groove is arranged on the axial end surface of the second plug 3 and one end of the rotating sleeve 12 is provided with a ring shaped axial extension portion 12b which is installed in the ring shaped groove of the second plug 3 through a bearing 15. In this embodiment, two bearings 15 are employed preferably. A shaft sleeve 16 is sleeved on the axial extension portion 12b, the shaft sleeve 16 separates the two bearings 15 and axially limits one end of the bearing 15; the other end of one bearing is axially limited through the bottom part of the ring shaped groove, the other end of the other bearing is axially limited through the radial protrusion 12a, in this way, the bearing can be prevented from axial shift.

In addition, the pressure-adjustable gas spring of the disclosure can be applied to office furniture including office chairs, office tables, etc., medical appliances, fitness equipment, household furniture including barstool, coffee table, etc., automobile gas springs and various mechanical equipment that need rigid telescopic adjustment, with wider application scope; meanwhile, the overall structure is simpler and the production cost is saved.

I claim:

1. A pressure-adjustable gas spring, comprising: an outer cylinder tube provided with openings at two ends, one end of the outer cylinder tube being provided with a first plug having a first through hole and the other end of the outer cylinder tube being provided with a second plug having a second through hole;

an inner cylinder tube located inside the outer cylinder tube and provided with openings at two ends, a floating separator piston being arranged between the inner cylinder tube and the outer cylinder tube;

a piston rod, one end of the piston rod being provided with a first piston and located in the inner cylinder tube and the other end of the piston rod passing through the first plug to extend outside the outer cylinder tube after being in clearance fit with one end of the inner cylinder tube;

a valve body, one end of the valve body being located in the outer cylinder tube and provided with a first sealing element and the other end of the valve body being located in the inner cylinder tube and provided with a second sealing element, and on the valve body being provided a first hole allowing a liquid medium to flow through and a second hole communicated with the first hole, the first hole being arranged along the radial direction of the valve body and the second hole being arranged along the axial direction of the valve body;

a control component controlling the liquid medium to flow through the valve body, one end of the control component blocking the second hole under the pressure of the liquid medium;

characterized in that: the valve body is one that can move along the axial direction of the outer cylinder tube and the inner cylinder tube;

further comprising: an adjustment assembly capable of enabling the valve body to move along the axial direction of the outer cylinder tube and the inner cylinder tube, the adjustment assembly being arranged on the second plug, one end of the adjustment assembly passing through the second plug to press against the valve body and the other end of the adjustment assembly being exposed to air, a through hole being arranged on the adjustment assembly, one end of the control component being exposed to air after passing through the second hole on the valve body and the through hole on the adjustment assembly in turn;

wherein the adjustment assembly comprises: a rotating sleeve arranged on the second plug in a rotatable manner, the rotating sleeve being axially limited on the second plug;

a hollow shaft, one end of the hollow shaft passing through the second plug to press against the valve body and the other end of the hollow shaft having an axial end surface of curved surface, or oblique plane or asymmetrical spherical surface;

a through hole inner surface of the rotating sleeve being provided with a curved surface or oblique plane or asymmetrical spherical surface matched with the surface of the hollow shaft, and, when the rotating sleeve is rotated, the rotating sleeve and the hollow shaft pressing against each other through the curved surface or oblique plane to make the hollow shaft produce an axial displacement.

2. The pressure-adjustable gas spring according to claim 1, characterized in that: a guide element is arranged on the outer circumference surface of the hollow shaft, a guide groove is arranged on the inner surface of the second through hole, and the guide element is in clearance fit in the guide groove.

3. The pressure-adjustable gas spring according to claim 1, characterized in that: the pressure-adjustable gas spring further comprises a tightening cap provided with an assembly hole, a radial protrusion is arranged on the outer circumference surface of the rotating sleeve, and, after the tightening cap is sleeved on the rotating sleeve and pressed on the radial protrusion of the rotating sleeve, the tightening cap is in fixed connection with the second plug so as to axially limit the rotating sleeve.

4. The pressure-adjustable gas spring according to claim 3, characterized in that: the assembly hole on the tightening cap is a stepped hole, and the step surface of the stepped hole presses against the radial protrusion on the rotating sleeve.

5. The pressure-adjustable gas spring according to claim 1, characterized in that: a ring shaped groove is arranged on the axial end surface of the second plug, and one end of the rotating sleeve is installed in the ring shaped groove through a bearing.

* * * * *